United States Patent

Roost et al.

(10) Patent No.: US 7,555,397 B2
(45) Date of Patent: Jun. 30, 2009

(54) CORIOLIS MASS FLOW METER AND METHOD FOR COMPENSATION OF TRANSMISSION ERRORS OF ITS INPUT CIRCUIT

(75) Inventors: Matthias Roost, Arlesheim (CH); Robert Lalla, Lörrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/443,366

(22) Filed: May 31, 2006

(65) Prior Publication Data

US 2006/0278021 A1    Dec. 14, 2006

Related U.S. Application Data

(60) Provisional application No. 60/685,494, filed on May 31, 2005.

(30) Foreign Application Priority Data

May 31, 2005   (DE) ............. 10 2005 025 354

(51) Int. Cl.
G01D 18/00   (2006.01)
G01F 25/00   (2006.01)

(52) U.S. Cl. ............ 702/89; 73/861.18; 73/861.19; 73/861.351; 73/861.354; 73/861.355; 73/861.356; 702/85; 702/107; 702/109

(58) Field of Classification Search ............ 73/861, 73/861.18, 861.19, 861.351, 861.354, 861.355, 73/861.356; 702/45, 50, 54, 85, 100, 108, 702/109, 124, 189, 89, 107

See application file for complete search history.

(56) References Cited

U.S. PATENT DOCUMENTS

| 3,240,919 | A | * | 3/1966 | Schultz ............. 702/109 |
| 3,426,593 | A | * | 2/1969 | Jacobs ............. 73/861.18 |
| 4,127,028 | A | * | 11/1978 | Cox et al. ............. 73/861.355 |
| 4,793,191 | A | * | 12/1988 | Flecken et al. ............. 73/861.357 |
| 5,044,207 | A | * | 9/1991 | Atkinson et al. ............. 73/861.357 |
| 5,844,408 | A | * | 12/1998 | Yoshimura et al. ............. 324/76.52 |
| 5,926,096 | A | | 7/1999 | Mattar |
| 6,332,366 | B1 | * | 12/2001 | Wray ............. 73/861.356 |

FOREIGN PATENT DOCUMENTS

| EP | 0 329 700 B1 | 8/1989 |
| EP | 0 866 319 B1 | 9/1998 |
| EP | 0 849 568 B1 * | 6/1999 |
| EP | 0 770 858 B1 * | 12/1999 |
| EP | 1 059 515 A1 | 12/2000 |
| EP | 1 229 309 A3 | 8/2002 |
| EP | 1 298 421 A1 | 4/2003 |
| JP | 58151518 | 9/1983 |
| WO | WO 2006/001805 | 1/2006 |

* cited by examiner

Primary Examiner—Edward R Cosimano
(74) Attorney, Agent, or Firm—Bacon & Thomas, PLLC

(57) ABSTRACT

A Coriolis mass flow meter and method for compensation of transmission errors of its input circuit, wherein a high accuracy of measurement is achievable by determining the transmission error of the input circuit of at least two input branches on the basis of at least one reference signal, which travels simultaneously through all input branches.

10 Claims, 5 Drawing Sheets

CORIOLIS MASS FLOW METER AND METHOD FOR COMPENSATION OF TRANSMISSION ERRORS OF ITS INPUT CIRCUIT

This application is a nonprovisional application claiming the benefit of now expired U.S. Provisional Application No. 60/685,494, which was filed on May 31, 2005.

FIELD OF THE INVENTION

The invention relates to a Coriolis mass flow meter and method for compensation of transmission errors of its input circuit. Coriolis mass flow meters are used in industrial measurement technology for measuring a mass flow, e.g. mass flow rate, of a medium in a section of pipeline.

BACKGROUND OF THE INVENTION

Coriolis mass flow meters include a measuring tube, which, during a measurement operation, is interposed in the pipeline section, such that the medium flows through it. The measuring tube is caused to oscillate. The oscillation of the measuring tube is affected by the medium flowing through. Measuring tube and medium form, together, an oscillatable system, which is, as a rule, excited to its resonance frequency. The resulting oscillatory motion of the measuring tube is usually registered by two oscillation sensors arranged on the measuring tube. The sensor signals of the oscillation sensors are accepted and conditioned by means of an input circuit. On the basis of the conditioned sensor signals, the mass flow is determined. The sensor signals have a frequency, which is equal to a frequency of the oscillation of the measuring tube. These signals are, however, shifted in phase relative to one another. The phase shift is a measure of the mass flow of the medium in the measuring tube.

EP-A 1 298 421 describes such a mass flow measurement pickup, in which the sensor signals are, in each case, fed to an associated input branch of the input circuit, where they are amplified and then digitized. The amplified, digitized sensor signals are fed to a digital signal processor, which, on the basis of these signals, determines mass flow. Determining mass flow occurs according to known methods, in which e.g. a phase shift or a time shift between the two sensor signals is calculated and the mass flow determined therefrom.

In such case, amplifiers, analog-digital converters, and passive filters possibly present in the input branches produce, as a rule, insufficiently specified and drifting phase rotations, or shifts. A zero-point error resulting therefrom is especially critical, when the determining of mass flow is done on the basis of a parallel evaluation of the separate sensor signals. While this zero-point error can be compensated, at least partially, by using sum and/or difference signals of the sensor signals, in the case of a parallel evaluation, every asymmetry of the input branches of the input circuit contributes to a resulting zero-point error.

This situation results in a measurement accuracy for the determining of mass flow, which, as a rule, can only be improved by cumbersome calibrations.

SUMMARY OF THE INVENTION

It is an object of the invention to provide a Coriolis mass flow meter, which enables a high measurement accuracy.

A further object is to provide a method for compensation of transmission errors of an input circuit of a Coriolis mass flow meter, by which method a high accuracy of measurement is achievable.

To this end, the invention provides a Coriolis mass flow meter including a measuring tube, which, during operation, is excited to oscillate and through which a medium flows, the mass flow of which is to be measured, first and second sensors for registering a mass flow-dependent oscillation of the measuring tube and for producing first and second sensor signals, at least one reference signal generator, which superimposes on the first and second sensor signals one and the same reference signal, a first input branch, for conditioning a first auxiliary signal formed of the first sensor signal and the superimposed reference signal, a second input branch, for conditioning a second auxiliary signal formed of the second sensor signal and the superimposed reference signal, means for filtering from the conditioned first auxiliary signal a conditioned first sensor signal and a conditioned first reference signal, means for filtering from the conditioned second auxiliary signal a conditioned second sensor signal and a conditioned second reference signal, means for determining a phase-difference, or travel-time-difference, (hereinafter "phase-, or travel-time-, difference") between the first conditioned reference signal and the second conditioned reference signal, means for correcting the phase-, or travel-time-, difference between the first and second, conditioned, sensor signals on the basis of the phase-, or travel-time-, difference between the first and second, conditioned, reference signals, and means for determining the mass flow on the basis of the corrected, conditioned, sensor signals.

In an embodiment, the means for filtering from the conditioned first auxiliary signal a conditioned first sensor signal and a conditioned first reference signal, and the means for filtering from the conditioned second auxiliary signal a conditioned second sensor signal and a conditioned second reference signal include two identical sets of, in each case, at least two filters, of which a first set serves for filtering from the conditioned first auxiliary signal the conditioned first sensor signal and the conditioned first reference signal, and of which a second set serves for filtering from the conditioned second auxiliary signal the conditioned second sensor signal and the conditioned second reference signal.

In an embodiment, the input branches include an amplifier and an analog-digital converter, and the filters are digital filters.

In a further development, the reference signal generator is a voltage generator or a digital reference signal generator, and each reference signal is an oscillating voltage with a predetermined frequency.

In a further development, the sensors each have a coil and the reference signal generator is connected with a first terminal of the one coil and a first terminal of the other coil. A second terminal of the one coil is connected with an input of the first input branch and a second terminal of the other coil with an input of the second input branch.

Additionally, the invention resides in a method for compensation of a phase-, or travel-time-, difference of Coriolis mass flow meter sensor signals conditioned in separate input branches, wherein a reference signal is superimposed in parallel on all sensor signals, each auxiliary signal formed by such superimposing passes through its own input branch, from the auxiliary signals conditioned in the input branches, in each case, a conditioned sensor signal associated with its input branch and an associated, conditioned reference signal are filtered out, a phase-, or travel-time-, difference between a respective two conditioned reference signals is determined, and on the basis of this phase-, or travel-time-, difference, a compensation of a phase-, or travel-time-, difference between two sensor signals is done, which sensor signals were conditioned in the two input branches, in which the two reference signals were also conditioned.

In a further development of the method, the phase-, or travel-time -, difference occurring between the respective two conditioned reference signals is registered over a period of time and the phase-, or travel-time-, differences registered over the period of time for the associated reference signals are used for compensation of the phase-, or travel-time-, difference between two currently conditioned sensor signals.

In a further development of the method, two, or more, reference signals of differing frequencies are used. For each reference signal, a phase-, or travel-time-, difference of the matching, conditioned, reference signals is determined. A frequency dependence of the phase-, or travel-time-, differences between the conditioned reference signals pairs effected by the input branches is determined, and, in the compensation, a frequency of the sensor signals and the frequency dependence of the phase-, or travel-time-, differences effected by the input branches is taken into consideration.

In a further development of the method, an amplitude of the reference signal is compared with the amplitudes of the matching conditioned reference signals and for each input branch an amplification factor is determined therefrom, which is taken into consideration in a further processing of the conditioned sensor signals.

Additionally, the invention resides in a method for determining a circuit-dependent, phase-, or travel-time-, difference between sensor signals conditioned in separate input branches or a condition-diagnosis of a Coriolis mass flow meter, in which method -a reference signal is fed in parallel to two input branches, -a phase-, or travel-time-, difference arising between the conditioned reference signals at the outputs of the two input branches is determined, and a phase-, or travel-time-, difference to be expected for the sensor signals, as caused by the input branches, is derived therefrom.

Additionally, the invention includes a method for determining a travel time, which a sensor signal of a Coriolis mass flow meter requires to pass through an input branch, wherein the reference signal generator produces a reference signal train, which passes through the input branch and the travel time required therefor is measured.

An advantage of the invention is that the transmission behavior of the input circuit is permanently monitored. A complicated calibration of the input circuit and its implementation and reduction to practice in the device becomes superfluous thereby.

A further advantage of the invention is that, by the permanent monitoring, measurement errors can then also be avoided, when, in the input circuit, instead of expensive components with close tolerances for transmission behavior, more cost-favorable elements are used, which can possibly exhibit markedly greater fluctuations in their transmission behavior.

BRIEF DESCRIPTION OF THE DRAWINGS

The invention and further advantages will now be explained in greater detail on the basis of the figures of the drawing presenting various examples of embodiments; equal parts are provided with equal reference characters in the figures. The figures show as follows.

DESCRIPTION OF THE PREFERRED EMBODIMENTS

Figure 1:
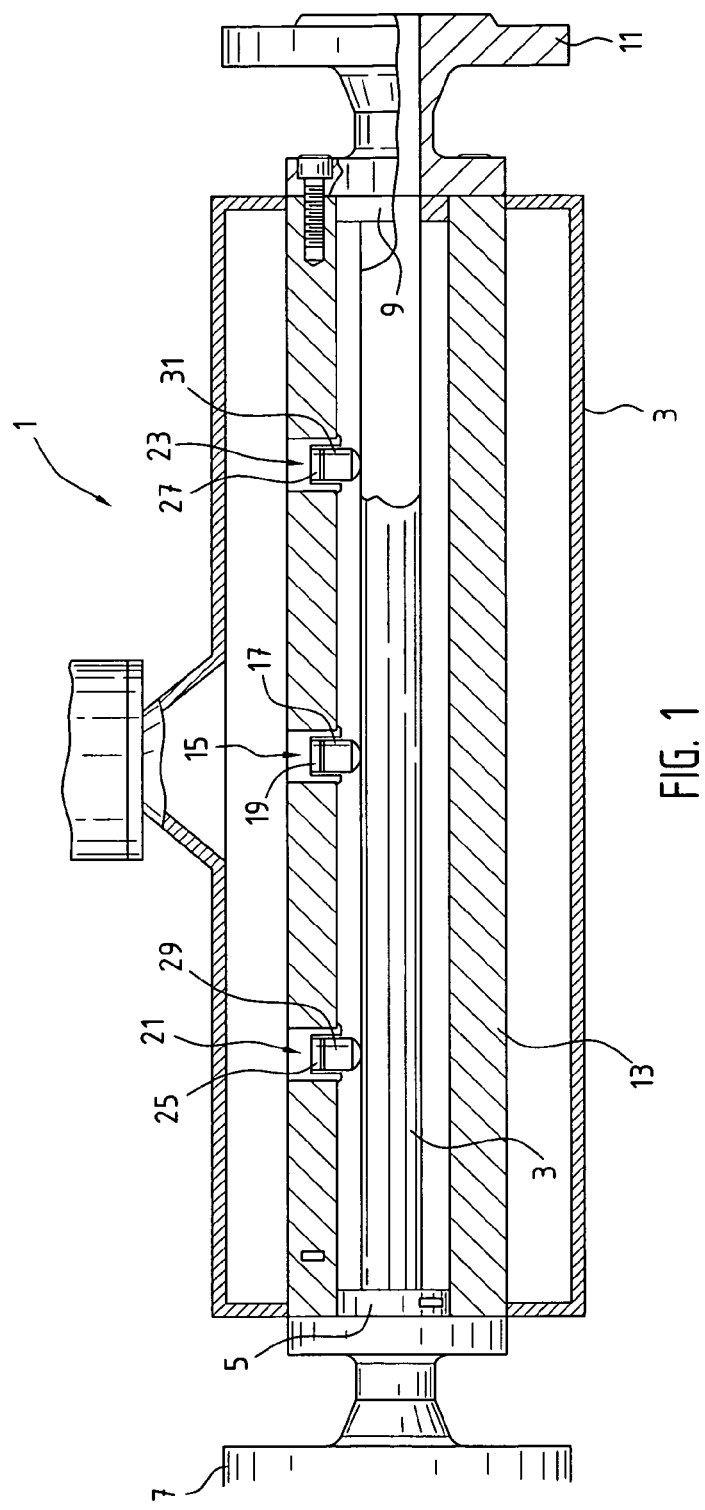
FIG. 1 a measurement pickup, or transducer, of a Coriolis mass flow meter.

FIG. 1 shows a measurement pickup, or transducer, 1 of a Coriolis mass flow meter. Measurement pickup 1 is arranged in a measurement operation in a pipeline (not shown), through which a medium, e.g. a gas or a liquid, is flowing, the mass flow rate of which medium is to be measured. Measurement pickup 1 includes a single, straight, measuring tube 3, which is affixed on its inlet end via an end plate 5 to a flange 7 and on its outlet end via an end plate 9 to a flange 11. The flanges 7, 11 and the end plates 5, 9 are secured on, or in, a support tube 13.

The invention is not limited to this specific measurement pickup 1 having a single, straight, measuring tube 3. It can be used also in connection with further, known, measurement pickups. To be mentioned are e.g. measurement pickups having a measuring tube with cantilevered mass, such as e.g. described in EP-A 97810559.1, measurement pickups having bent measuring tubes, such as described e.g. in EP -A 96109242.6, as well as measurement pickups having two, parallel, straight or bent, measuring tubes, such as described e.g. in U.S. Pat. No. 4,793,101 or in U.S. Pat. No. 4,127,028.

Measuring tube 3 is excited to oscillate during measuring operation. For producing the measuring tube oscillations, an oscillation exciter 15 is arranged on the measuring tube 3, in the middle, between the two end plates 5, 9. Suitable as oscillation exciter 15 is e.g. an electromagnetic drive composed of a permanent magnet 17 and a coil 19. Coil 19 is secured to the support tube 13 and the permanent magnetic 17 is secured to the measuring tube 3. Via an electrical current flowing in the coil 19, amplitude and frequency of a bending oscillation of the measuring tube 3 occurring in the plane of the drawing can be controlled. The oscillatory system is, in such case, preferably driven in resonance.

Arising in the plane of the drawing are Coriolis forces, the result of which is that not all points along the measuring tube 3 oscillate in phase. The oscillation of measuring tube 3 is registered with the help of first and second sensors 21, 23. Sensors 21, 23 are preferably arranged symmetrically about the oscillation exciter 15. Suitable as sensors 21, 23 are e.g.

electromagnetic transducers, which each have a coil 25, 27 secured on the support tube 13 and a permanent magnet 29, 31 arranged on the measuring tube 3. Movement of the measuring tube 3 causes a movement of the permanent magnets 29, 31 in the coils 25, 27, and, consequently, induced voltages in the respective coils 25, 27. The induced voltages can be accessed across the coils 25, 27 and are available, in each case, as first and second, analog, sensor signals S1, S2 produced by the sensors 21, 23. The two sensor signals S1, S2 exhibit the same frequency $f_S$ and are shifted in phase with respect to one another. The phase difference arising between the sensor signals S1, S2 is a measure for the mass flow rate. The frequency $f_S$ lies typically in the order of magnitude of several hundred Hertz.

Figure 2:
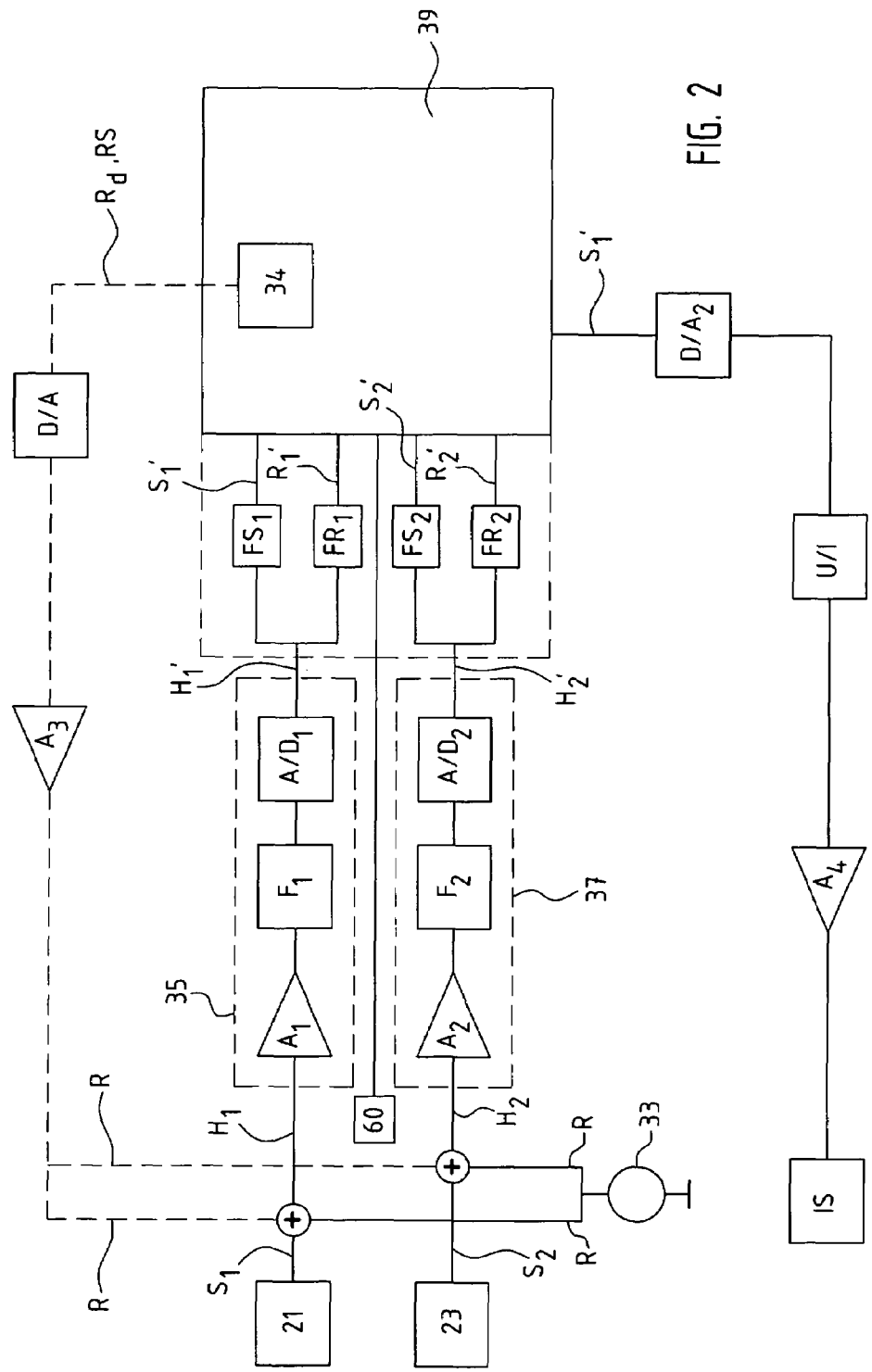
FIG. 2 an input circuit of the Coriolis mass flow meter of the invention connected to the sensors.

FIG. 2 shows connected to the sensors 21, 23 an input circuit of the Coriolis mass flow meter of the invention. The input circuit includes a reference signal generator 33, which superimposes one and the same reference signal R on the first and second sensor signals S1, S2. Preferably, the reference signal generator 33 is a voltage generator, which superimposes a voltage on the sensor signals S1, S2. This offers for the described mass flow meter the advantage that an electrical current flow, which, under the right circumstances, could affect the measuring tube oscillation via the coils 25, 27, is avoided. The reference signal R is preferably an oscillating voltage of predetermined frequency $f_R$, which is distinguishable from the frequency $f_S$ of the sensor signals S1, S2. In the case of a frequency $f_S$ of the sensor signals of e.g. 800 Hz, the frequency $f_R$ of the reference signal R can be e.g. 300 Hz. Suitable reference signal generators are e.g. voltage-controlled oscillators (VCO). The reference signal R can also be generated in digital form, e.g. in sinusoidal form, by a digital reference signal generator 34, which is e.g. part of a signal processing unit 39 present already. The digital reference signal $R_d$ is then, as indicated in FIG. 2 by the dashed-line connections, converted by means of a digital-analog converter D/A and, as required, an amplifier A3 into an analog reference signal R and superimposed on the sensor signals S1, S2. Digital reference signal generators offer the advantage that a phase position of the generated digital reference signal $R_d$ is known very accurately.

By superimposing the reference signal R on the first and second sensor signals S1, S2, first and second auxiliary signals H1, H2 are obtained. The first auxiliary signal H1 is fed to a first input branch 35, which serves for conditioning the auxiliary signal H1 formed from the first sensor signal S1 and the superimposed reference signal R. Analogously, the second auxiliary signal H2 is fed to a second input branch 37, which serves for conditioning the auxiliary signal H2 formed from the second sensor signal S2 and the superimposed reference signal R.

The input branches 35, 37 serve for signal conditioning. The signal conditioning can include e.g. an amplification, a filtering and/or a digitizing. The input branches can be embodied in many different ways. In the illustrated example of an embodiment, only typically used elements of the input branches 35, 37 are shown, by way of example. Other, much more complicated forms of embodiment are likewise usable in appropriate circumstances. Preferably, the two input branches 35, 37 are identically constructed. The illustrated input branches 35, 37 each include an amplifier A1, A2, a filter F1, F2, and an analog-digital converter $A/D_1$, $A/D_2$. The filters F1, F2 are e.g. passive filters or anti-aliasing filters. Components of such type produce an insufficiently specific and drifting, phase shift, or phase rotation. Even two completely identically constructed input branches 35, 37, therefore, exhibit transmission behaviors differing from one another. Correspondingly, because of this, even in the case of concurrent conditioning of two identical signals, a phase-, or travel-time-, difference between the conditioned signals arises at the output of the input branches 35, 37. This circuit-related, phase-, or travel-time-, difference is greater, the more the input branches differ from one another. The circuit-related, phase-, or travel-time-, difference is undesired, since the phase-, or travel-time-, difference actually occurring between the sensor signals S1, S2 is a measured variable depending on mass flow rate and determined with the aid of the Coriolis mass flow meter. Any circuit-related phase-, or travel-time-, difference has, therefore, a negative influence on the accuracy of measurement. In the case of conventional Coriolis mass flow meters, efforts have been made to keep this error as small as possible, e.g. by using in the input branches only components of extremely high bandwidth. By way of example, in the case of a frequency $f_S$ of the sensor signals S1, S2 of 800 Hz, components with bandwidths in the order of magnitude of 100 MHz have been used. The invention avoids this stress on components of high measuring accuracy. Thus, components with markedly less bandwidth can be used.

According to the invention, the input branches 35, 37 have, preferably, a bandwidth, which is greater than the frequency $f_R$ of the reference signal R and greater than the frequency $f_S$ of the sensor signals S1, S2. In the case of a frequency $f_R$ of the reference signal R of 300 Hz and a frequency $f_S$ of the sensor signals S1, S2 of 800 Hz, a bandwidth, for example, in the order of magnitude of 1 MHz is sufficient.

According to the invention, the reference signal R is superimposed on the sensor signals S1, S2, and the auxiliary signals H1, H2 formed by this superimposing each pass through a respective one of the input branches 35, 37. Following the first input branch 35 are means for filtering from the conditioned first auxiliary signal H1' a conditioned first sensor signal S1' and a conditioned first reference signal R1'. Following the second input branch 37 are means for filtering from the conditioned second auxiliary signal H2' a conditioned second sensor signal S2' and a conditioned second reference signal R2'.

In the illustrated example of an embodiment, these means include two identical sets of, in each case, two filters FS1 and FR1, FS2 and FR2, of which a first set serves for filtering from the conditioned first auxiliary signal H1' available at the output of the first input branch 35 a conditioned first sensor signal S1' and a conditioned first reference signal R1', and of which a second set serves for filtering from the conditioned second auxiliary signal H2' available at the output of the second input branch 37 a conditioned second sensor signal S2' and a conditioned second reference signal R2'. Since the conditioned auxiliary signals H1' and H2' are present in digital form, the filters FS1 and FR1, FS2 and FR2 are digital filters. The two means can, however, also have very much more complex structures. The separating of the respective, conditioned, sensor signals S1', S2' from the conditioned reference signals R1', R2' can occur e.g. using mixers and further components.

Means 39 are provided, which serve for determining a phase-, or travel-time-, difference between the first conditioned reference signal R1' and the second conditioned reference signal R2'. In the illustrated example of an embodiment, this task is assumed by a digital signal processor 39, on whose inputs the output signals of the filters FS1 and FR1, FS2 and FR2 lie. The filters FS1 and FR1, FS2 and FR2 are represented here as self-sufficient components, for purposes of better understanding. Modern signal processors exhibit a high functionality and can be used for a wide variety of tasks. Especially, they are very well suited to assume the functions of the filters FS1 and FR1, FS2 and FR2. In line with this, the filters FS1 and FR1, FS2 and FR2 can be integrated in the signal processor 39. This is indicated in FIG. 2 by a dashed line.

The phase difference Äö(R1', R2') is given directly by comparison of the first and second, conditioned, reference signals R1', R2' and can be derived in many ways by means of known methods, such as e.g. a comparison of the zero-crossings, correlation formation, etc.. The associated travel-time difference Ät(R1', R2') is equal to the quotient of the phase difference Äö(R1', R2') and the frequency $f_R$ of the reference signal R.

$$Ät(R1', R2')=Äö(R1', R2')/f_R$$

Since the two conditioned reference signals R1', R2' originate from one and the same reference signal R, the travel-time difference Ät(R1', R2') of the conditioned reference signals R1', R2' is a purely circuit-related travel-time difference and the phase difference Äö(R1', R2') is a purely circuit-related phase difference. In such case, the transmission behavior of the entire input circuit from the point of the superimposing through to the output is captured.

The circuit-related travel-time difference is, to a first approximation, frequency independent. Correspondingly, there is, between the conditioned sensor signals S1', S2', a travel-time difference Ät(S1', S2'), which, to a first approximation, is equal to the sum of the circuit-related travel time difference and a travel-time difference Ät(S1, S2) actually present between the sensor signals S1, S2 and dependent on the mass flow rate.

According to the invention, means 39 are provided for correction of the phase-, or travel-time-, difference Äö(S1', S2'), Ät(S1', S2') between the first and second, conditioned, sensor signals S1', S2'. The correction occurs on the basis of the previously derived phase-, or travel-time-, difference Äö(R1', R2'), Ät(R1', R2') between the first and second, conditioned, reference signals R1', R2'. Means 39 includes, in the illustrated example of an embodiment, the digital signal processor. There, a correction of the conditioned sensor signals S1', S2' is performed on the basis of the phase difference Äö(R1', R2'), or the travel-time difference Ät(R1', R2'), between the first and second, conditioned, reference signals R1', R2'.

Preferably, the sensor signals S1' and S2' are not corrected separately, but, instead, a correction of the desired measured variables, i.e. the phase-, or travel-time-, difference, is performed directly. The phase-, or travel-time-, difference Äö(S1', S2'), Ät(S1', S2') of the conditioned sensor signals S1', S2' is, in such case, determined, for example, in exactly the same manner as the phase-, or travel-time-, difference Äö(R1', R2'), Ät(R1', R2') of the conditioned, reference signals R1', R2'. Such determining is done, preferably, likewise in the digital signal processor 39.

The correction of the travel-time difference Ät(S1', S2') of the conditioned sensor signals S1', S2' is done, preferably, according to the following formula:

$$Ät(S1, S2')cor=Ät(S1', S2')-Ät(R1', R2')$$

wherein
Ät(S1', S2')cor is the corrected travel-time difference between the conditioned sensor signals S1',S2',
Ät(S1', S2') is the measured travel-time difference between the conditioned signals S1', S2', and
Ät(R1', R2') is the circuit-related, travel-time difference between the conditioned, reference signals R1', R2'.

The correction of the phase difference Äö(S1', S2') of the conditioned sensor signals S1', S2' is done, preferably, according to the following formula:

$$Äö(S1', S2')cor=Äö(S1', S2')-Ät(R1', R2')2\pi f_s.$$

wherein
Äö(S1', S2')cor is the corrected phase difference between the conditioned sensor signals S1', S2',
Äö(S1', S2') is the measured phase difference between the conditioned signals S1', S2',
Ät(R1', R2') is the circuit-related, travel-time difference between the conditioned, reference signals R1', R2', and
$f_s$ is the frequency of the sensor signals S1, S2.

Additionally, the Coriolis mass flow meter includes means 39 for determining the mass flow rate on the basis of the corrected, conditioned, sensor signals S1', S2', especially on the basis of the corrected phase-, or travel-time-, difference Äö(S1', S2')cor, Ät(S1', S2')cor of the same.

Also these means 39 are implemented in the form of the digital signal processor in the illustrated example of an embodiment. The determining of the mass flow rate can occur in many known ways. Thus, all known ways of determining can be used that apply the phase-, or travel-time-, difference, as the characteristic measured variable. The determining of the mass flow rate can be done, for example, on the basis of the proportionality between the travel-time difference of the sensor signals and the mass flow rate. Proportionality constants, as well as possibly relevant dependencies e.g. on temperature or density of the liquid, are, as a rule, device specific and can be stored in the device in the form of calibration data and taken into consideration during the determination by appropriate algorithms.

Figure 3:
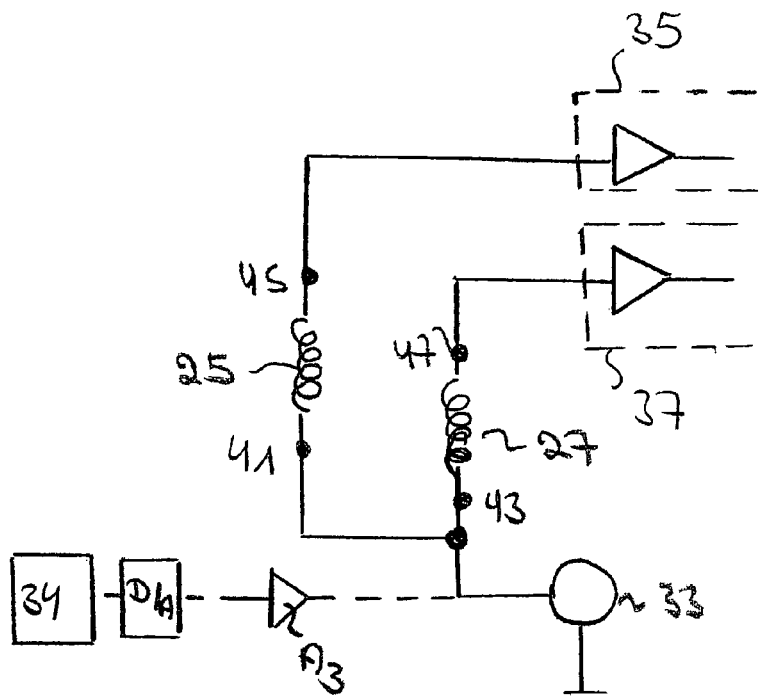
FIG. 3 a first circuit for injecting the reference signal, in which a reference signal generator is connected to the coils of the sensors.
Figure 4:
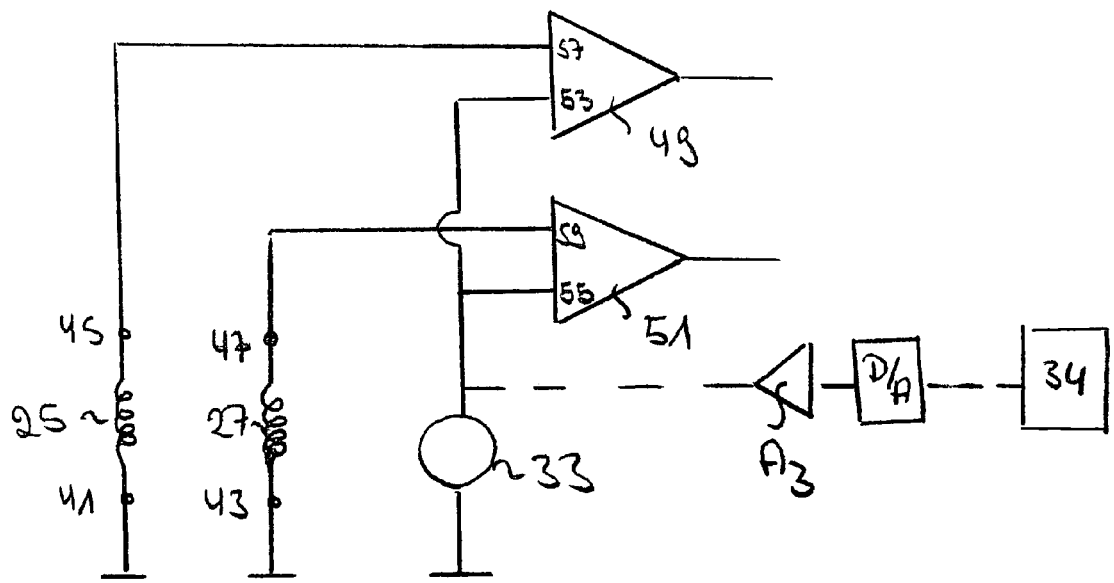
FIG. 4 a second circuit for injecting the reference signal, in which the reference signal is superimposed on the sensor signals via difference amplifiers.

The superimposing of the reference signals R can occur in many different ways. FIGS. 3 and 4 present two examples of embodiments in this connection, where they are applicable in connection with the sensors 21, 23 of FIG. 1 with their coils 25, 27.

In the case of the example of an embodiment illustrated in FIG. 3, the reference signal generator 33 is a voltage-controlled oscillator, which is connected with a first terminal 41 of the coil 25 and a first terminal 43 of the coil 27. A second terminal 45 of coil 25 is connected with an input of the first input branch 35 and a second terminal 47 of the coil 27 is connected with an input of the second input branch 37. Equally, the digital reference signal generator 34 already described in connection with FIG. 2 can be used here. This is indicated in FIG. 3 by dashed connection lines, by which the digital reference signal generator 34 is connected via the digital-analog converter D/A and, as required, via the amplifier A3, with the first terminal 41 of the coil 25 and the first terminal 43 of the coil 27.

These circuit offer the advantage that the induced voltages and the voltage of the reference signal R superimpose, without the reference signal R leading to an electrical current flow through the coils 25, 27, because such could possibly affect the oscillatory behavior of the measuring tube 3.

In the case of the example of an embodiment illustrated in FIG. 4, the superimposing is effected via the sum- or difference-amplifiers 49, 51 associated with the input branches 35, 37. The sum- or difference-amplifiers 49, 51 can, in such case, be connected in front of the input branches 35, 37, or they can be part of the input branches 35, 37, by placing them at the locations of the amplifiers A1, A2 shown in FIG. 2. Also here, exactly as in the case of the example of an embodiment illustrated in FIG. 3, both the analog reference signal generator and the digital reference signal generator 34 are applicable. The reference signal generator 33 is connected with a reference potential, e.g. with ground or a circuit zero point. Reference signal R lies on a first input 53 of the sum-or difference-amplifier 49 for the first input branch 35 and on a first input 55 of the sum- or difference-amplifier 51 for the second input branch 37. The coils 25, 27 also lie at the reference potential, via their first terminals 41, 43. The second terminal 45 of the coil 25 is connected with a second input 57 of the sum- or difference-amplifier 49 for the first input branch 35, and the second terminal 47 of the coil 27 is connected with a second input 59 of the sum- or difference-amplifier 51 for the second input branch 37.

With the described Coriolis mass flow meter, a method of the invention, as above-described, is executed for compensation of a circuit-related, phase-, or travel-time-, difference of measuring device signals conditioned in separate input branches. According to the method of the. invention, a reference signal is superimposed in parallel on at least two signals, and each of the auxiliary signals formed by such superimposing passes through its own input branch. From the auxiliary signals conditioned in the input branches, in each case, a conditioned signal associated with its input branch and an associated, conditioned, reference signal are filtered out. A phase-, or travel-time-, difference existing between, in each case, two conditioned, reference signals is determined. Then, according to the invention, this phase-, or travel-time-,difference between the reference signals is used to effect a compensation of a phase-, or travel-time-, difference between, in each case, two signals, which were conditioned in the two input branches in which the two reference signals were also conditioned.

This method is not limited to Coriolis flow measurement. It can be applied always when a compensation of a circuit-related, phase-, or travel-time-, difference of measuring device signals conditioned in separate input branches is desired. Such a compensation is always of advantage when the phase-, or travel-time-,difference of the signals is a measured variable, or of importance for the determination of a measured variable.

The method is applicable for any number of signals and input branches. In terms of an example, consider Coriolis mass flow meters with three, four, or more sensors and a corresponding number of input branches. The compensation can then be performed according to the method of the invention for each pair of two signals and the associated two input branches.

The circuit-related, phase-, or travel-time-, difference is, as a rule, dependent on temperature and on the specifics of the separate components of the input branches and, therefore, changes only slowly. The accuracy of the method of the invention can, therefore, be additionally improved by capturing the circuit-related phase-, or travel-time-, difference existing between, in each case, two conditioned reference signals over a period of time and using, for the compensation of the phase-, or travel-time-, difference between two currently conditioned signals, the phase-, or travel-time-, differences of the associated, conditioned, reference signals captured over the period of time. Determination of the length of the period of time, over which the phase-, or travel-time-, differences are captured, can be done on the basis of estimated values and, for example, on the basis of a temperature measurement. In such case, preferably the temperature in the region of the input branches 35, 37 is measured. To this end, in the example of an embodiment illustrated in FIG. 2, a temperature sensor 60 is provided, the measurement results of which are fed to the signal processing unit 39. If the measured temperature is approximately constant, a longer period of time is chosen, while, if the temperature is changing, then the length of the period of time is correspondingly shortened.

To this end, two examples will be covered below on the basis of the above-described example of the Coriolis mass flow meter.

In a first variant, the circuit-related, phase-, or travel-time-, differences Ät(R1', R2'), Äö(R1', R2') existing between, in each case, two conditioned reference signals R1', R2' are captured over a period of time, and an average value $ÄT_1(R1', R2')$, $ÄÖ_1(R1', R2')$ is formed from values of the phase-, or travel-time-, differences Ät(R1', R2'), Äö(R1', R2') lying chronologically within a time interval and following on one another. The determining of the corrected phase-, or travel-time -, differences of the conditioned sensor signals S1', S2' is then effected as described above, wherein, for the phase-, and travel-time-, difference Ät(R1', R2'), Äö(R1', R2') of the associated, conditioned, reference signals R1', R2', their average value $ÄT_1(R1', R2')$, $ÄÖ_1(R1', R2')$ is used.

In a second variant, the circuit-related, phase-, or travel-time-, differences Ät(R1', R2'), Äö(R1', R2') existing between, in each case, two conditioned reference signals R1', R2' are captured over a period of time, by recording the conditioned reference signals R1', R2' over a longer time interval, and long-time values $ÄT_2(R1', R2')$, $ÄÖ_2(R1', R2')$ are determined for the phase-, or travel-time-, differences, by deriving the phase-, or travel-time-, difference in the manner explained above, wherein, however, the entire signal train of conditioned reference signals R1', R2', recorded within the time interval is taken into consideration. The determining of the corrected phase-, and travel-time-, differences of the conditioned sensor signals S1', S2' then occurs as described above, wherein, for the phase-, and travel-time-, difference Ät(R1', R2'), Äö(R1',. R2') of the associated, conditioned, reference signals R1', R2', the corresponding long-time value $ÄT_2(R1', R2')$, $ÄÖ_2(R1', R2')$ is used.

Figure 5:
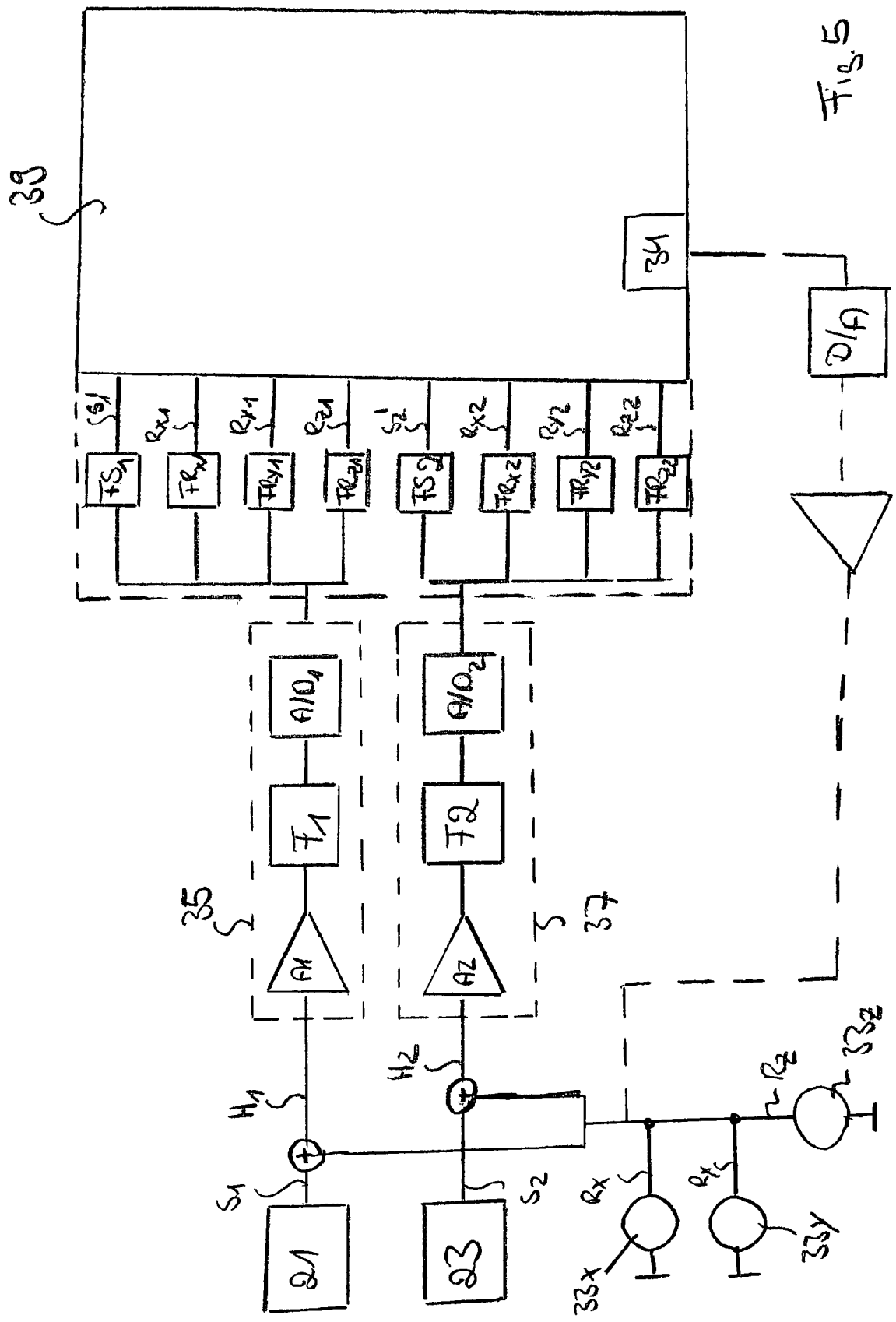
FIG. 5 connected to the sensors, an input circuit, which has three reference signal generators.

A further improvement of the accuracy of the method can be achieved by taking into consideration the frequency dependence of the conditioning occurring in the input branches. This improved method will now be explained in greater detail, by way of example, based on the above-described Coriolis mass flow meter. FIG. 5 shows an example of a corresponding circuit.

Two, or more, reference signals Rx, Ry, Rz of difference frequencies $f_{Rx}, f_{Ry}, f_{Rz}$ are used. The reference signals Rx, Ry, Rz can be fed-in sequentially via a corresponding actuating of the reference signal generator 33 shown in FIG. 2. Alternatively, they can, as shown in FIG. 5, be provided simultaneously by a corresponding number of reference signal generators $33x$, $33y$, $33z$, such that they become superimposed together on the sensor signals S1, S2. Exactly as in the case of the above-described examples of embodiments, also, here, digital reference signal generators can be used, the digital signals $R_d$ of which are converted via digital-analog converters D/A and, as required, amplifiers A3 into analog reference signals Rx, Ry, Rz. This variant is illustrated, also here, by means of dashed lines. In such case, the digital reference signal generator 34, or the digital reference signal generators 34, as the case may be, is/are integrated in the signal processor 39.

As a result of the superimposing, formed, in each case, are two auxiliary signals H1, H2, which pass through their associated input branches 35, 37. Following this, for each reference signal Rx, Ry, Rz, a phase-, or travel-time-, difference Ät(Rx1, Rx2), Äö(Rx1, Rx2), Ät(Ry1, Ry2), Äö(Ry1, Ry2) and Ät(Rzl, Rz2), Äö(Rzl, Rz2) of the associated, conditioned, reference signals Rx1 and Rx2, Ry1 and Ry2, as well as Rz1 and Rz2 is determined.

To this end, means are again provided for effecting the splitting of the conditioned auxiliary signals H1', H2' into the separate components. For example, at the output of each input branch 35, 37, there is, in each case, a filter FS1, FS2, respectively, for the corresponding, conditioned sensor signals S1', S2', and, in each case, a filter FRx1, respectively FRx2, FRy1, respectively FRy2, and FRz1, respectively FRz2 for each conditioned reference signal Rx1, respectively Rx2, Ry1, respectively Ry2, and Rz1, respectively Rz2. The determining of the phase-, or travel-time-, differences Ät(Rx1, Rx2), Äö(Rx1, Rx2), Ät(Ry1, Ry2), Äö(Ry1, Ry2), and Ät(Rz1, Rz2), Äö(Rz1, Rz2) of the associated, conditioned, reference signals Rx1 and Rx2, Ry1 and Ry2, and Rz1 and Rz2 occurs in the same manner as for the determining of the phase-, or travel-time-, differences Ät(R1', R2'), Äö(R1', R2') already described above.

Figure 6:
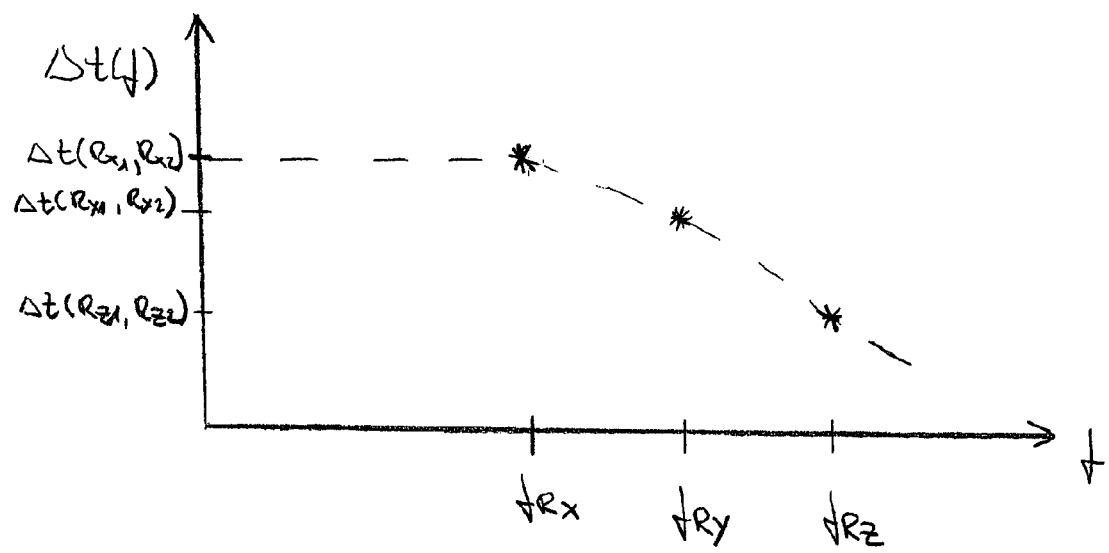
FIG. 6 a circuit-related, travel-time difference as a function of frequency.

On the basis of the determined phase-, or travel-time-, differences Ät(Rx1, Rx2), Äö(Rx1, Rx2), Ät(Ry1, Ry2), Äö(Ry1, Ry2), and Ät(Rz1, Rz2), Äö(Rz1, Rz2) of the associated, conditioned, reference signal pairs Rx1 and Rx2, Ry1 and Ry2, and Rz1 and Rz2, a frequency dependence of a phase-, or travel-time -, difference Ät(f), Äö(f) brought about by the input branches 35, 37 is determined. FIG. 6 shows travel-time difference Ät(f) resulting from the input branches 35, 37, as a function of frequency, with the travel-time differences Ät(Rx1, Rx2), Ät(Ry1, Ry2) and Ät(Rz1, Rz2) determined for the separate reference signals Rx, Ry, Rz being entered as measured data points. The curve exhibits in the low-frequency region an approximately constant behavior, and falls-off at the higher frequencies. The frequency dependence of the travel-time difference Ät(f) caused by the input branches 35, 37 can be determined, for example, by the fitting of a polynomial to the data points. On the basis of such a polynomial, the travel-time difference Ät(f) to be expected for any frequency, especially for the frequency $f_s$ of the sensor signals S1, S2, in the vicinity of the frequencies $f_{Rx}$, $f_{Ry}$, $f_{Rz}$ of the measured data points, can then be determined.

If only two different reference signals, e.g. Rx and Ry, are used, then the frequency dependence of the travel-time difference Ät(f) resulting from the input branches 35, 37 is determined, for example, by interpolation. Preferably, in this case, the frequencies $f_{Rx}$, $f_{Ry}$ are so chosen, that one is greater and one is smaller than the frequency $f_s$ of the sensor signals S1, S2. Also in this way, the travel-time difference Ät(f) to be expected for any frequency, especially for the frequency $f_s$ of the sensor signals S1, S2, in the vicinity of the frequencies $f_{Rx}$, $f_{Ry}$ of the measured data points, can then be determined.

Following the procedures as just described above, a compensation of the phase-, or travel-time-, difference Ät(S1', S2'), Äö(S1', S2') of the conditioned signals S1', S2' is carried out, with both the frequency $f_s$ of the sensor signals S1, S2 and the frequency dependence of the travel time difference Ät(f) caused by the input branches being taken into consideration.

To this end, for example, a corrected travel-time difference Ät(S1', S2')cor of the conditioned sensor signals S1', S2' is determined according to the following formula:

$$\ddot{A}t(S1', S2')cor = \ddot{A}t(S1', S2') - \ddot{A}t(f_s)$$

wherein the following definitions pertain:
 Ät(S1', S2')cor the corrected travel-time difference between the conditioned sensor signals S1', S2';
 Ät(S1', S2') the measured travel-time difference between the conditioned sensor signals S1', S2';
 Ät ($f_s$) the circuit-related, frequency-dependent, travel-time difference Ät(f) at the frequency $f_s$ of the sensor signals, as determined on the basis of the reference signals Rx, Ry, Rz or Rx, Ry; and
 $f_s$ the frequency of the sensor signals S1, S2.

Analogously, a corrected phase difference Äö(S1', S2')cor of the conditioned sensor signals S1', S2' is determined according to the following formula:

$$\ddot{A}\ddot{o}(S1', S2')cor = \ddot{A}\ddot{o}(S1', S2') - \ddot{A}\ddot{o}(f_s)$$

wherein the following definitions pertain:
 Äö(S1', S2')cor the corrected phase difference between the conditioned sensor signals S1', S2';
 Äö(S1', S2') the measured phase difference between the conditioned sensor signals S1', S2';
 Ät ($f_s$) the circuit-related, frequency-dependent, travel-time difference Ät(f) at the frequency $f_s$ of the sensor signals, as derived on the basis of the reference signals Rx, Ry, Rz or Rx, Ry; and
 $f_s$ the frequency of the sensor signals S1, S2.

In a fully analogous manner, the frequency dependence of the phase difference Äö(f) resulting from the input branches 35, 37 can be determined, on the basis of which, in an analogous manner, a compensation of the phase, or travel-time, difference Ät(S1', S2'), Äö(S1', S2') of the conditioned sensor signals S1', S2' can be performed, in the case of which both the frequency $f_s$ of the sensor signals S1, S2 and also the frequency dependence of the phase difference Äö(f) caused by the input branches 35, 37 are taken into consideration.

Preferably, the reference signals are used not only to capture the transmission behavior of the input branches 35, 37 with regard to phase and travel time, but also with reference to amplitude. Knowledge of the transfer function of the input circuit with respect to amplitude is e.g. of special advantage, when, additionally, the viscosity of the liquid is being derived with the measuring device. In known methods for determining viscosity, the amplitude is input as measured variable.

If only one reference signal R is used for capturing the transmission behavior with reference to amplitude, then, for example, the amplitude of the reference signal R is compared with the amplitudes $A_{R1}$, $A_{R2}$ of the associated, conditioned reference signals R1, R2, and, from this there is determined for each input branch 35, 37 an amplification, or gain, factor V1, V2, which is taken into consideration in the case of a further processing of the conditioned sensor signals S1', S2'. As a rule, it is sufficient, in such case, to observe the amplitudes of the maxima of the separate signals. The amplification factors V1, V2 are determined, preferably, in the digital signal processor 39 by determining the amplitudes of the maxima and, from this, calculating the amplification factors V1, V2. Thus, there results:

$$V1 := A_{R1}/A_R$$

$$V2 := A_{R2}/A_R$$

wherein the following definitions hold:
 V1 amplification factor of the first input branch 35;
 V2 amplification factor of the second input branch 37;
 $A_{R1}$ amplitude of the reference signal R1 conditioned in the first input branch 35;
 $A_{R2}$ amplitude of the reference signal R2 conditioned in the second input branch 37; and
 $A_R$ amplitude of the reference signal R.

Correction of the amplitudes AS1', AS2' of the conditioned sensor signals S1', S2' is then done e.g. by multiplying the conditioned sensor signals S1', S2' by the reciprocals of their associated amplification factors V1, V2.

Analogously to the above details for the phases and travel times, also, in this case, a frequency dependence of the amplification factors V1, V2 can be determined on the basis of two or more reference signals of differing frequencies, and such can be appropriately taken into consideration in the correction.

If at least one of the input branches 35, 37 has as an amplifier A1, A2, an amplifier with a controllable amplification factor, then its amplification factor can be controlled corresponding to the determined amplification factors V1, V2, such that both input branches 35, 37 effect the same amplification.

In the case of the above-described forms of embodiment of the invention, auxiliary signals H1, H2 were always utilized, which were formed by superimposing a reference signal R, Rx, Ry, Rz on the sensor signals S1, S2. It is, however, also possible to determine the circuit-related phase-, or travel-time-, difference between sensor signals of a Coriolis mass flow meter conditioned in separate input branches, in the absence of the sensor signals. This can be done, for example, by means of the circuits illustrated in FIG. 2 or FIG. 5 by uncoupling the sensors 21, 23. This is, for example, the case, when the measurement pickup 1 is not yet connected to the subsequent circuit, or when no oscillation is being excited. Alternatively, a switch can be inserted, so that the sensors are switchable.

In this method, at least one reference signal is fed in parallel to two input branches 35, 37 and the phase-, or travel-time-, difference arising at the output of the two input branches 35, 37 between the conditioned reference signals R1, R2 is determined. From this, as already described above on the basis of the earlier forms of embodiment, a phase-, or travel-time -, difference to be expected for the sensor signals and caused by the input branches is derived.

The last-mentioned method can be applied for testing the presence and the functional ability of the entire input circuit of the mass flow meter independently of the measurement pickup 1 and to generate a condition diagnosis and/or malfunction report.

In Coriolis flow measuring technology, the oscillatory system including the measuring tube 3 is preferably excited to oscillate with its. resonance frequency. To this end, as a rule, a control loop is provided, via which the sensors 23, 25 are connected with the oscillations exciter 15. This occurs e.g., as illustrated in FIG. 2, by feeding a conditioned sensor signal S1' to a digital-analog converter D/A$_2$. An output voltage of the digital-analog converter D/A$_2$ is converted by means of a voltage-current converter U/I into an electrical current I, which is fed as exciter current I$_{ex}$ to the oscillation exciter 15 via a controllable amplifier A4. An exciter current I$_{ex}$ flowing through the coil 19 of the oscillation exciter 15 effects an oscillation of the oscillatory system, which is picked-up via the sensors 21, 23 and the input branches 35, 37. For achieving resonance, a phase-correct feedback is required. This is achieved by a corresponding tuning of a delay time between a receipt of the sensor signals S1, S2 and their feedback to the oscillation exciter 15. The delay time is achieved, preferably, in the digital signal processor 39 by a delayed forwarding. Advantageously, the delay time is determined on the basis of a travel time, which the signals require, in order to move through the entire control loop of digital signal processor 15, the sensors 21, 23, and the input branch 35, 37, back to the digital signal processor 39.

In such case, a travel time T, which the sensor signals S1, S2 require, in order to travel through the respective input branches 35, 37, represents, as a rule, an initially unknown and variable quantity. This travel time T can be determined very accurately on the basis of the reference signals. This will now be explained in greater detail on the basis of the example of an embodiment presented in FIG. 2. To this end, a short reference signal train RS is produced preferably by means of the digital reference signal generator 34 shown in FIG. 2. The reference signal train RS is fed to the digital-analog converter D/A by means of the digital signal processor 39. In such case, a point in time of the send-off of the reference signal train is captured in the digital signal processor 39. This can be done, for example, by starting a time measurement with the send-off. The reference signal RS travels through the input branches 35, 37 and returns to the digital signal processor 39. The point in time of the return of the signal train RS is captured in the digital signal processor 39, and the time measurement is terminated. On the basis of the time difference between the send-off and the return of the signal train RS, the sought travel time T is determined and can be ascertained separately for each input branch 35, 37.

LIST OF REFERENCE CHARACTERS 1 measurement pickup, or transducer
3 measuring tube
5 end plate
7 flange
9 end plate
11 flange
13 support tube
15 oscillation exciter
17 permanent magnet
19 coil
21 sensor
23 sensor
25 coil
27 coil
29 permanent magnet
31 permanent magnet
33 reference signal generator
35 input branch
37 input branch
39 digital signal processor
41 first terminal
43 first terminal
45 second terminal
47 second terminal
49 difference amplifier
51 difference amplifier
53 first input
55 first input
57 second input
59 second input

We claim:
1. A coriolis mass flow meter, comprising:
a measuring tube, which is excited to oscillate during a measurement operation and through which a liquid flows, the mass flow of which is to be measured;
first and second sensors for registering a mass-flow-dependent oscillation of said measuring tube and for producing first and second sensor signals;
at least one reference signal generator, which superimposes on said first and second sensor signals one and the same reference signal;
a first input branch for conditioning a first auxiliary signal formed from said first sensor signal and said superimposed reference signal;
a second input branch for conditioning a second auxiliary signal formed from said second sensor signal and said superimposed reference signal;
means serving for filtering from said conditioned first auxiliary signal a conditioned first sensor signal and a conditioned first reference signal;
means serving for filtering from said conditioned second auxiliary signal a conditioned second sensor signal and a conditioned second reference signal;
means for determining one of: a phase difference and a travel-time difference between said first, conditioned, reference signal and said second, conditioned, reference signal; and for either correcting the phase difference between said first and second, conditioned, sensor signals on the basis of said phase difference between said first, conditioned, reference signal and said second, conditioned, reference signal or for correcting the travel- time difference between said first and second conditioned sensor signals on the basis of said travel-time difference between said first conditioned reference signal and said second conditioned reference signal; and for determining the mass flow on the basis of the corrected, conditioned, sensor signals.

2. The coriolis mass flow meter as claimed in claim 1, wherein:
said means for filtering a conditioned first sensor signal and a conditioned first reference signal from said conditioned first auxiliary signal, and said means for filtering a conditioned second sensor signal and a conditioned first reference signal from said conditioned second auxiliary signal comprise two identical sets of, in each case, at least two filters, of which a first set serves for filtering said conditioned first sensor signal and said conditioned first reference signal from said conditioned first auxiliary signal, and a second set serves for filtering said conditioned second sensor signal and said conditioned second reference signal from said conditioned second auxiliary signal.

3. The coriolis mass flow meter as claimed in claim 1, wherein:
said input branches each have an amplifier and an analog-digital converter, and said filters are digital filters.

4. The coriolis mass flow meter as claimed in claim 1, wherein:
reference signal generator is a voltage-generator or a digital reference signal generator, and each reference signal is an oscillatory voltage with a predetermined frequency.

5. The coriolis mass flow meter as claimed in claim 1, wherein:
each of said sensors includes a coil;
said reference generator is connected with a first terminal of one of the coils and with a first terminal of the other of said coils; and
a second terminal of said one of said coils is connected with an input of said first input branch and a second terminal of said other of said coils is connected with an input of said second input branch.

6. A method for compensation of a phase difference-, or for compensation of a travel-time-, difference of Coriolis mass flow meter sensor signals conditioned in separate input branches of the Coriolis mass flow meter, comprising the steps of:
superimposing in parallel on all sensor signals a reference signal; passing through its own input branch each auxiliary signal formed by said superimposing;
filtering out, for each input branch, a conditioned sensor signal associated therewith and a conditioned reference signal also associated therewith, of the auxiliary signal conditioned therein;
determining one of: a phase and travel-time, difference in each case, between two conditioned reference signals; and, either
performing, on the basis of said phase difference a compensation of a phase difference, between two sensor signals, which were conditioned in the two input branches, in which the two reference signals were also conditioned, or
performing. on the basis of said travel-time difference, a compensation of a travel-time difference between two sensor signals. which were conditioned in the two input branches, in which the two reference signals were also conditioned.

7. The method as claimed in claim 6, wherein:
an amplitude of the reference signal is compared with the amplitudes of the belonging, conditioned, reference signals and an amplification factor is determined therefrom for each input branch; and
the amplification factor is taken into consideration in a further processing of the conditioned sensor signals.

8. The method as claimed in claim 6, wherein: either said phase difference arising between, in each case, two conditioned reference signals is captured over a period of time, and said phase differences captured over the period of time for the associated reference signals are referenced for the compensation of said phase, difference between the two currently conditioned sensor signals: or said travel-time difference arising between, in each case, two conditioned reference signals is captured over a period of time, and said travel-time differences captured over the period of time for the associated reference signals are referenced for the compensation of said travel-time difference between the two currently conditioned sensor signals.

9. The method as claimed in claim 8, wherein:
two or more reference signals of different frequencies are employed;
for each reference signal, said one of: a phase and travel-time, difference of the belonging, conditioned, reference signals is determined;
a frequency dependence of said one of: phase and travel-time, differences caused by the input branches between conditioned reference signal pairs is determined; and
a frequency of the sensor signals and the frequency dependence of said one of: phase and travel-time, differences are taken into consideration in the compensation.

10. A method for determining a travel time, of a sensor signal of a Coriolis mass flow meter, comprising: a measuring tube, which is excited to oscillate during a measurement operation and through which a liquid flows, the mass flow of which is to be measured; first and second sensors for registering a mass-flow-dependent oscillation of said measuring tube and for producing first and second sensor signals; at least one reference signal generator, which superimposes on said first and second sensor signals one and the same reference signal; a first input branch for conditioning a first auxiliary signal formed from said first sensor signal and said superimposed reference signal; a second input branch for conditioning a second auxiliary signal formed from said second sensor signal and said superimposed reference signal; means serving for filtering from said conditioned first auxiliary signal a conditioned first sensor signal and a conditioned first reference signal; means serving for filtering from said conditioned second auxiliary signal a conditioned second sensor signal and a conditioned second reference signal; means for determining one of: a phase and travel-time, difference between said first, conditioned, reference signal and said second, conditioned, reference signal; and for either correcting a phase difference between said first and second, conditioned, sensor signals on the basis of said one of: phase and travel-time, difference between said first, conditioned, reference signal and said second, conditioned, reference signal; or correcting a travel-time difference between said first and second conditioned sensor signals on the basis of said travel-time difference between said first conditioned reference signal and said second conditioned reference signal: and for determining the mass flow on the basis of the corrected, conditioned, sensor signals, comprising the step of:
producing a reference signal train, which passes through the input branch and the travel time needed therefor is measured.

* * * * *